United States Patent
Izumi et al.

(10) Patent No.: US 7,425,983 B2
(45) Date of Patent: Sep. 16, 2008

(54) SECURITY SYSTEM

(75) Inventors: Shiho Izumi, Hitachi (JP); Hiroshi Kuroda, Hitachi (JP); Satoru Kuragaki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 995 days.

(21) Appl. No.: 10/755,293

(22) Filed: Jan. 13, 2004

(65) Prior Publication Data
US 2004/0141056 A1    Jul. 22, 2004

(30) Foreign Application Priority Data
Jan. 21, 2003    (JP)    ............. 2003-011741

(51) Int. Cl.
*H04N 7/18*    (2006.01)

(52) U.S. Cl. .............. 348/143; 348/148; 348/155

(58) Field of Classification Search ........... 348/143, 348/148, 155, 340; 340/531; 250/342; 342/70
See application file for complete search history.

(56) References Cited

U.S. PATENT DOCUMENTS

| | | | | |
|---|---|---|---|---|
| 4,849,635 A | * | 7/1989 | Sugimoto | 250/342 |
| 5,473,368 A | * | 12/1995 | Hart | 348/155 |
| 5,936,666 A | * | 8/1999 | Davis | 348/143 |
| 6,140,954 A | * | 10/2000 | Sugawara et al. | 342/70 |
| 6,400,265 B1 | * | 6/2002 | Saylor et al. | 340/531 |
| 6,734,911 B1 | * | 5/2004 | Lyons | 348/340 |
| 2002/0102101 A1 | | 8/2002 | Pelletier | |

FOREIGN PATENT DOCUMENTS

| | | |
|---|---|---|
| DE | 197 10 727 A1 | 9/1998 |
| EP | 0 899 580 A2 | 3/1999 |
| FR | 2 700 046 | 7/1994 |
| GB | 1 357 456 | 6/1974 |
| GB | 2 250 156 A | 5/1992 |
| GB | 2 323 236 A | 9/1998 |
| JP | 61-246685 A | 11/1986 |
| JP | 5-180936 A | 7/1993 |
| JP | 2000-003478 | 1/2000 |
| JP | 2000-338231 | 12/2000 |

OTHER PUBLICATIONS

European Search Report.
European Search Report dated Jun. 13, 2006 Four (4) pages.
European Search Report dated Mar. 2, 2007 (Four (4) pages).

* cited by examiner

*Primary Examiner*—Allen Wong
(74) *Attorney, Agent, or Firm*—Crowell & Moring LLP

(57) ABSTRACT

A simple outdoor security system which uses sensors to monitor an area around a building to detect intruders while reducing the number of sensors necessary for ensuring detection accuracy, which has at least a detection means for radiating light or an electric wave to a prescribed area to detect an object, receiving a wave reflected by the object and detecting at least the speed and location of the object; an imaging means for imaging the object; and a means for directing said imaging means toward the object according to the object's speed and location detected by said detection means.

17 Claims, 9 Drawing Sheets

FIG. 1
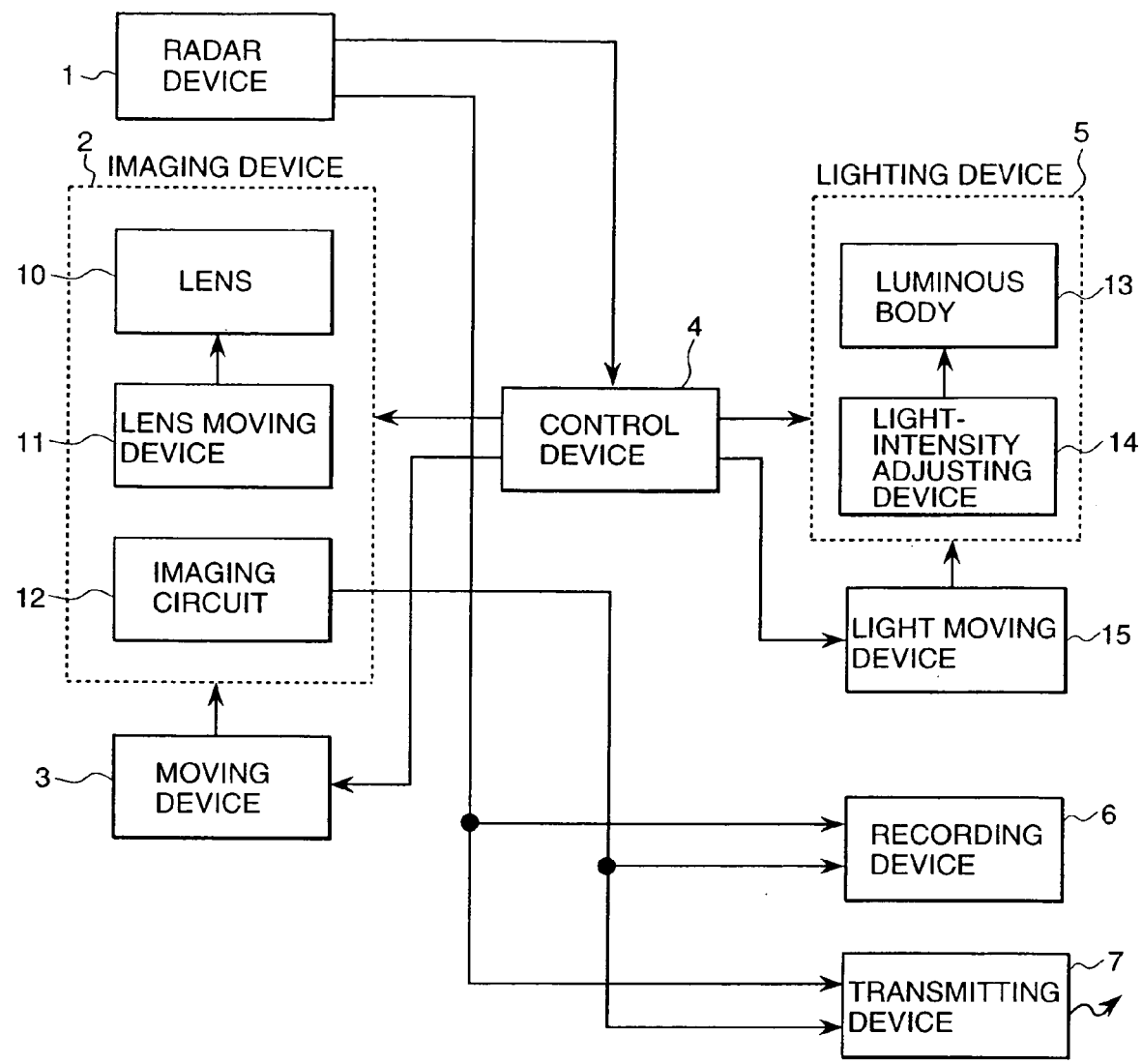
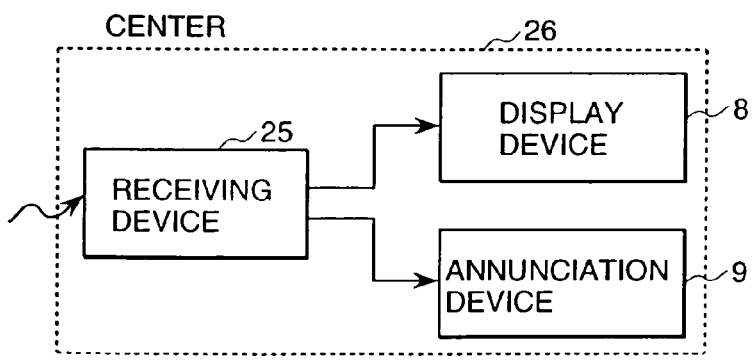

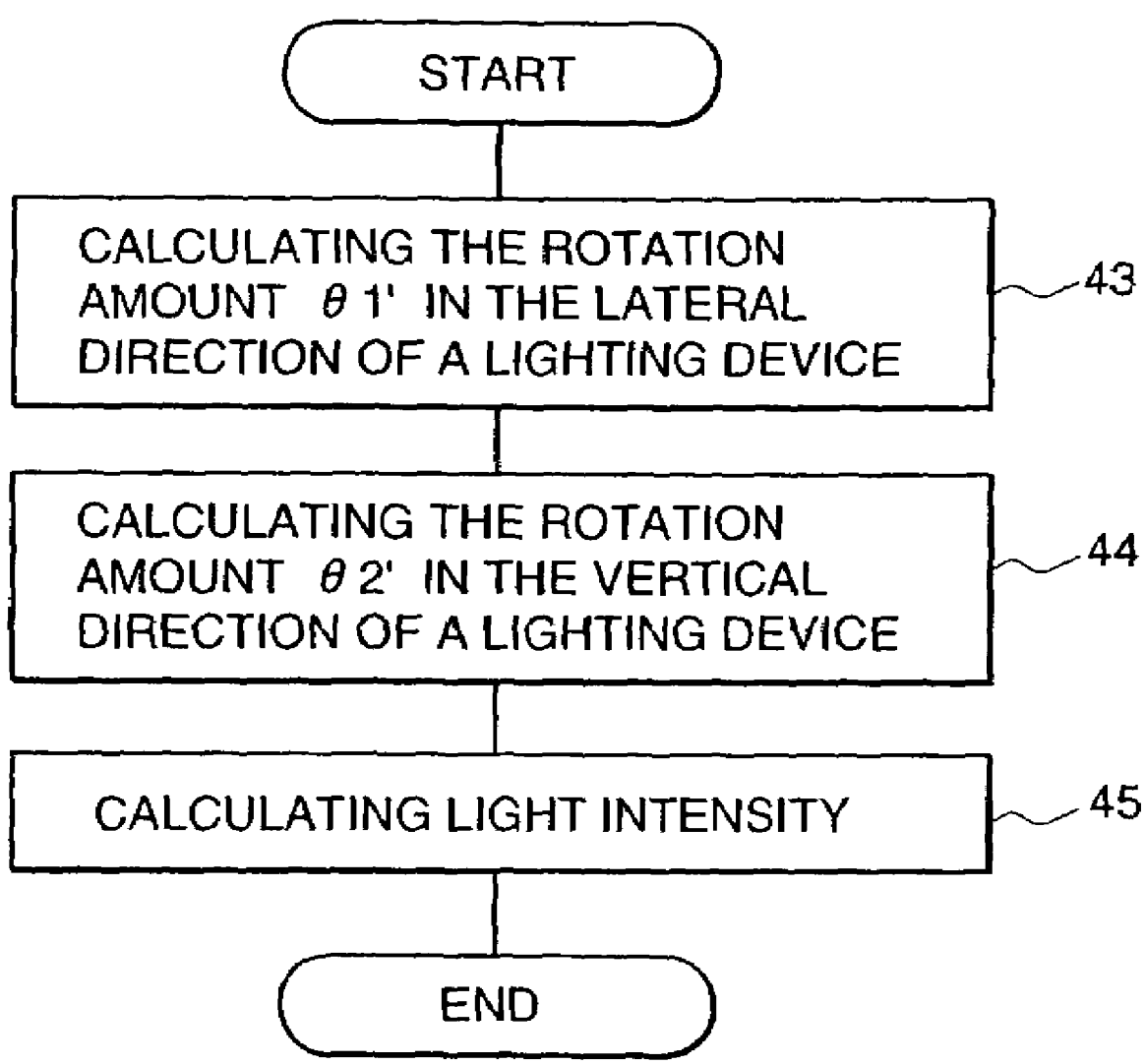

SECURITY SYSTEM

BACKGROUND OF THE INVENTION

The present invention relates to a security system for monitoring a prescribed area by using a device for transmitting light or electric wave and an imaging device.

As prior art, there is an indoor security system which detects a person and the like in a building by using an FM-CW type radar and captures the image with a camera (see Japanese Patent Application Laid-Open No.2000-3478).

An FM-CW type radar antenna's beam width (electric wave transmission angle) must be narrow in terms of principle, which results in one antenna detecting only a narrow area (normally, 10 degrees or less). Therefore, to ensure the entire area to be monitored, it is necessary to adopt a method that scans the monitoring area by making an antenna rotate back and forth or a method that sequentially switches a plurality of antennas arranged in line. Thus, the above-mentioned prior art has a problem in that the entire monitoring area cannot be simultaneously monitored, which decreases accuracy of intruder detection. Furthermore, if the above-mentioned prior art is applied to an outdoor security system which monitors an area around a building, it is necessary to arrange a large number of antennas around the building, thereby making wiring and installation work cumbersome and complicated and increasing installation and maintenance costs.

Moreover, the above-mentioned prior art detects the existence of a mobile object and the number of objects according to changes of the spectrum of the beat signal in the monitoring area and also makes it necessary to record information by the hour. If it is applied to an outdoor security system, there are the problems of increased storage capacity and costs because increasing arithmetic processing requires a high-performance processing unit.

SUMMARY OF THE INVENTION

In the light of the above-mentioned problems, an object of the present invention is to provide a simple outdoor security system without decreasing detection accuracy.

To solve the above-mentioned problems, the present invention comprises at least a detection means for radiating light or an electric wave to a prescribed area to detect an object, receiving a wave reflected by the object and detecting at least the speed and location of the object, an imaging means for imaging the object, and a means for directing said imaging means toward the object according to the object's speed and location detected by said detection means.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIG. 1 shows an example of the method for notifying an operator who is standing by in the center that an intruder or runaway has been detected.

FIG. 11 shows an example of the operations to control the direction and light intensity of the lighting device.

DETAILED DESCRIPTION OF THE PREFERRED EMBODIMENTS

Figure 2:
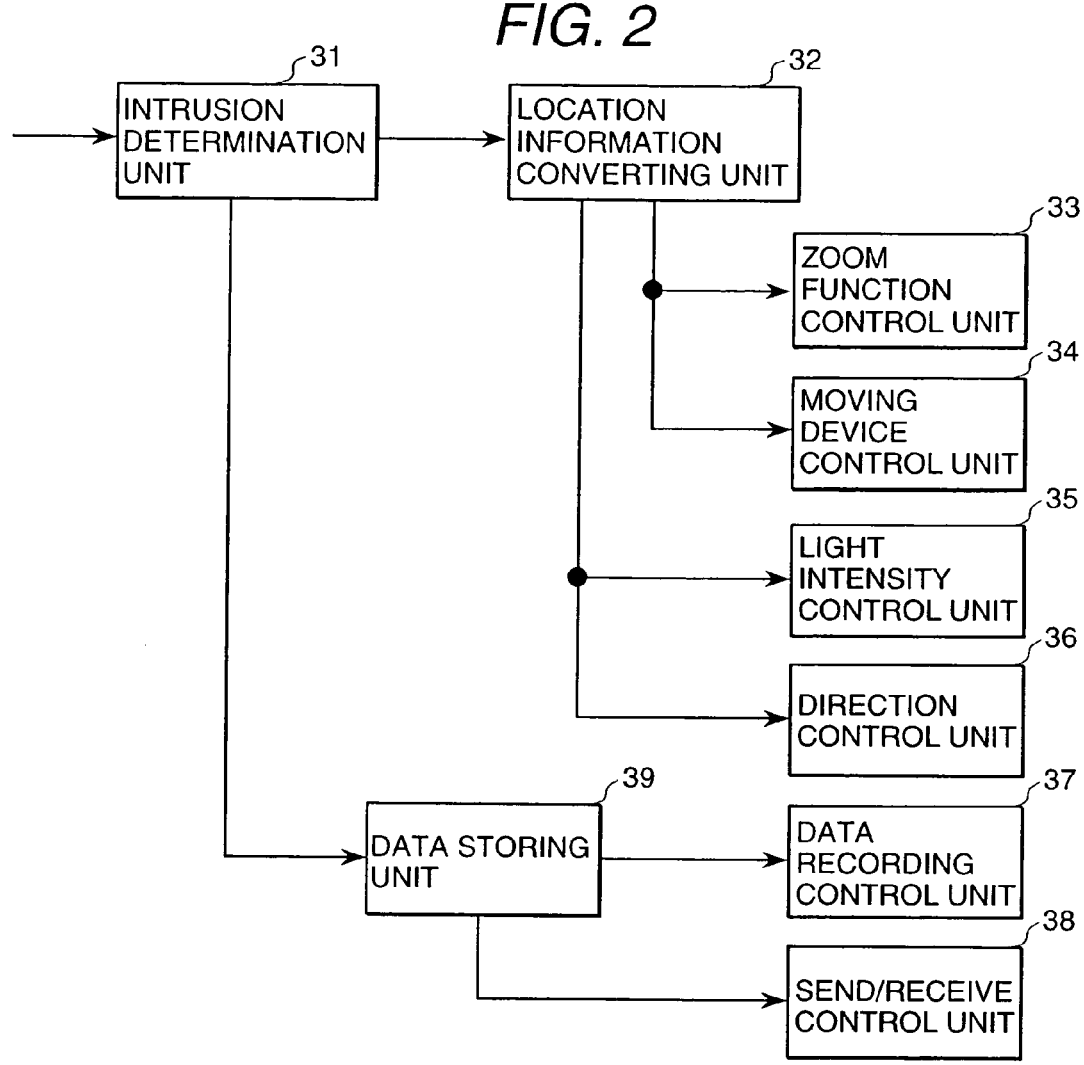
FIG. 2 is an example of the operations of the control device.

The present invention will be discussed hereinafter in detail in terms of the preferred embodiment of security system according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscurity of the present invention.

Hereafter, the present invention will be explained by referring to the preferred embodiments.

As an embodiment of the present invention, a system which detects an intruder into a building and images the intruder will be explained. FIG. 1 shows the configuration of the system according to this embodiment which installs a radar device 1 and an imaging device 2 in a building to detect and image an intruder or runaway.

The radar device 1 radiates light or an electric wave to a prescribed area so as to detect an object and measure the speed and location of the object. When detecting an object, the device sends information concerning the object's speed and location to a control device 4.

The imaging device 2 is a means for collecting image information of a certain area and this embodiment uses a camera. The imaging device 2 has an automatic focusing function and also has a zoom function to enlarge or reduce the size of the detected object by means of a lens moving device 11 for moving a lens 10. In this system, because focusing and zooming operations are conducted by using information about distance to the object detected by the radar device 1, the focusing and zooming speed is faster than the method that uses information about an image captured by an imaging device.

The moving device 3 is a means for moving the imaging device 2 up, down, right and left. It can move the imaging device 2 toward the direction of the object detected by the radar device by means of the control device 4 which will be described in the following paragraph.

The control device 4 controls the moving device 3 and imaging device 2 according to the speed and location of the intruder detected by the radar device 1, tracks and images the detected object. Accordingly, it can image the object in a size larger than the prescribed value regardless of the distance to the detected object. To illuminate the object detected by the radar device 1, the light moving device 15 which moves up, down, right and left operates the lighting device 5 to track the detected object. The lighting device 5 has a light-intensity adjusting device 14 which calculates intensity of light to be radiated according to the distance to the object detected by the radar device 1 and adjusts the intensity of light emitted from the luminous body 13. Consequently, it is possible to accurately image an intruder even at night. The light radiated herein is not limited to a visible ray, and other kinds of light and electric wave can be used according to the use environment and use purpose of the system and type of the imaging device.

The recording device 6 records information concerning the speed, distance and direction of the object detected by the radar device 1 and also records images captured by the imaging device 2.

If this recording device 6 is designed to start recording when an object is detected by the radar device 1 instead of recording information all the time, recording capacity can be less.

The transmitting device 7 transmits information concerning the speed, distance and direction of the object detected by the radar device together with the images captured by the imaging device 2 to the center.

In the center 26, a receiving device 25 receives radar information and image information and the display device 8 displays the information. Accordingly, an operator can confirm whether the detected object is an intruder or not by watching the display device 8 in the center instead of rushing to the site. The center 26 also has an annunciation device 9 for notifying an operator who is standing by at the center 26 that an object has been detected when the receiving device 25 receives information transmitted by the transmitting device 7. This enables the operator to become aware of the detected object without the operator constantly looking at the display device 8, thereby reducing a burden on the operator.

Now, an embodiment of a method for the radar device 1 to calculate the distance, direction and speed of the object will be described.

Any means can be applied to a radar device 1 as long as the means can detect an object's speed and location. However, a monopulse system in which an electric wave is sent by one transmission antenna and is received by two receiving antennas thereby detecting the azimuth of a target is most suitable because it makes it possible to monitor a wide area and detect a plurality of targets by means of one transmission antenna. This monopulse radar device enables a wide-angled area of 100 degrees to be monitored by one transmission antenna.

Figure 3:
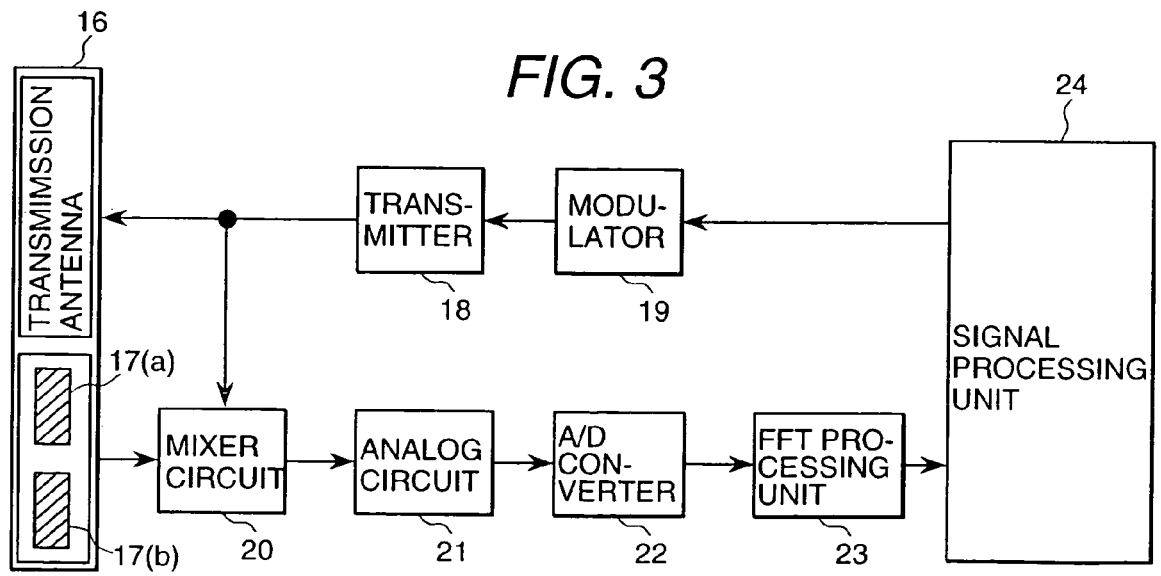
FIG. 3 shows the principle of the radar device.

With reference to FIG. 3, an embodiment of the radar device 1 will be described. First, the antenna portion consists of a transmission antenna 16 and two receiving antennas 17(a), 17(b). The transmission antenna 16 transmits a millimeter-wave band high-frequency signal sent by a transmitter 18 at a frequency according to the modulation signal from the modulator 19. Two receiving antennas 17(a), 17(b) receive the electric wave signal which was reflected by an object located in the area where the electric wave was transmitted and a mixer circuit 20 converts the frequency. The mixer circuit 20 also receives a signal from the transmitter 18, and therefore, a low-frequency signal generated as the result of the mixture of two signals is outputted to an analog circuit 21. The signal is amplified by the analog circuit 21 and outputted, and is then converted into a digital signal by an A/D converter 22. Next, the signal is sent to the FFT processing unit 23. The FFT processing unit 23 applies the Fast Fourier Transform (FFT) to measure the signal's frequency spectrum as information of amplitude and phase and sends the data to a signal processing unit 24. Based on the data in the frequency area obtained by the FFT processing unit 23, the signal processing unit 24 calculates the distance and relative speed and outputs the data as a measured distance value and a measured relative speed value. Herein, an example that uses the 2-frequency CW (Continuous Wave) method will be described with reference to FIGS. 3 and 4. In the method, an object's relative speed is measured by applying the Doppler shift, and switching two frequencies enables the measurement of the distance to the object based on the phase information of the received signal at each frequency.

Figure 4A:
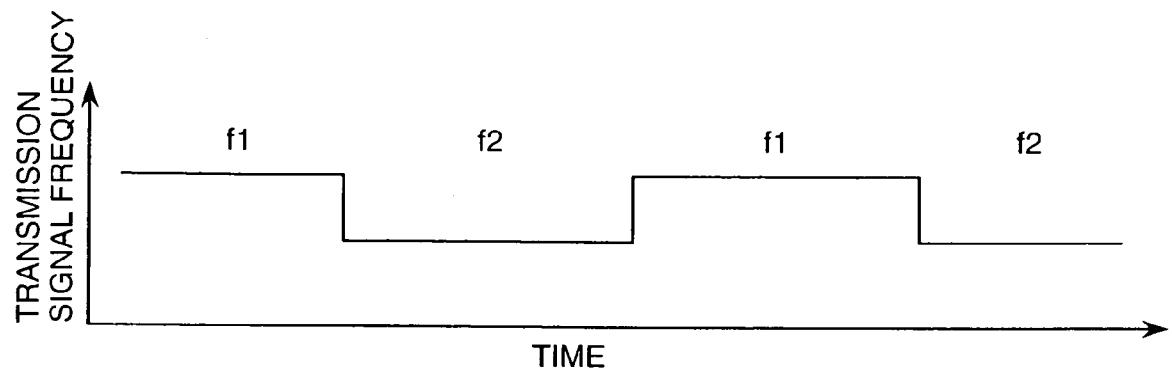
FIG. 4 shows the principle of the 2-frequency CW method.

In the 2-frequency CW type radar, a modulation signal is inputted into the transmitter 18 and two frequencies f1, f2 are alternately transmitted with time intervals as shown in FIG. 4(a). An electric wave transmitted by the transmission antenna 16 is reflected by an object in front and the reflected signal is received by two receiving antennas 17(a), 17(b). The mixer circuit 20 mixes the received signal with a signal sent by the transmitter 18 and obtains a beat signal. In a homodyne method in which a signal is directly converted into a base band, the beat signal outputted from the mixer circuit 20 is the Doppler frequency which is calculated by the following equation:

$$fd = \frac{2 \cdot f_c}{c} v \quad \text{(Equation 1)}$$

Figure 4B:
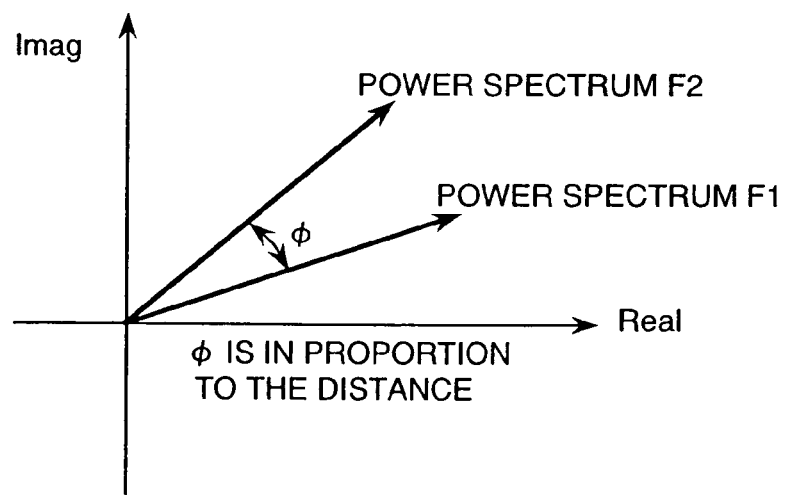

Herein, $f_c$ denotes carrier frequency, v denotes relative speed, and c denotes light velocity. On the receiving side, a received signal at each transmitted frequency is separated and demodulated by the analog circuit 21 and then converted into a digital signal by the A/D converter 22. Then the FFT processing unit 23 computes the Fast Fourier Transform of the digital sample data obtained as the result of the A/D conversion to obtain the frequency spectrum in the entire frequency band of the received beat signal. Concerning the peak signal obtained as the result of the FFT processing, based on the principle of the 2-frequency CW method, the power spectra of the peak signals corresponding to transmission frequency f1 and transmission frequency f2, as shown in FIG. 4(b), are measured, and then the range is calculated from phase difference φ between two power spectra according to the following equation:

$$\text{range} = \frac{c \cdot \phi}{4\pi \cdot \Delta f} \quad \text{(Equation 2)}$$

$$\Delta f = f2 - f1$$

Figure 5:
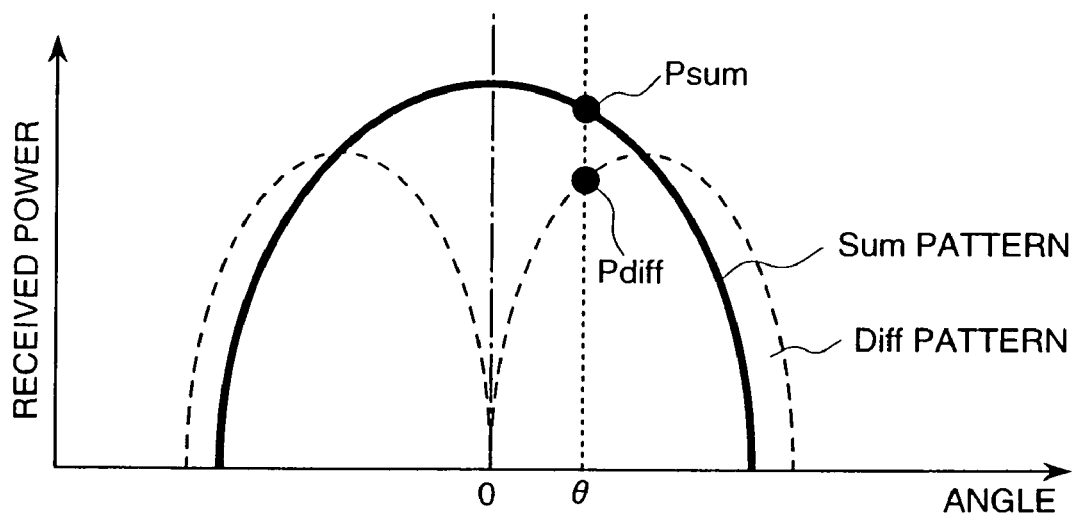
FIG. 5 shows the principle of the monopulse angle measuring method.

Next, a method of measuring the direction is explained with reference to FIG. 5. FIG. 5 shows the pattern of the power received by each receiving antenna corresponding to the angle. Because both the power received by the receiving antenna 17(a) and the power received by the receiving antenna 17(b) become maximum when θ is zero degree, the pattern of the sum signal (Sum pattern) of the signals inputted into the receiving antennas 17(a), 17(b) and the pattern of the difference signal (Diff pattern) are constant as shown in FIG. 5. Therefore, by calculating the sum signal (Psum) and the difference signal (Pdif) of the signals inputted into the receiving antennas 17(a), 17(b), azimuth θ can be specified according to the ratio of electric power of the received signals.

Figure 6:
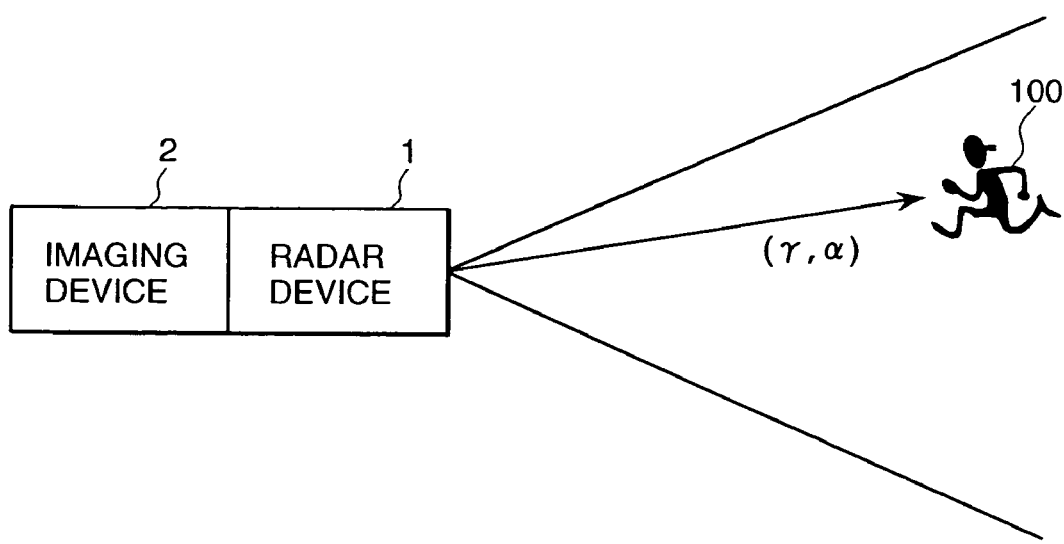
FIG. 6 shows an area to be detected by the radar device and the imaging device.

Next, FIG. 2 is a block diagram that explains the operations of the control device 4. Herein, the range and angle of the object detected by the above-mentioned radar device 1 are denoted as (r, α) and the relative speed is denoted as v. Furthermore, an explanation is provided about the situation where the radar device 1 and the imaging device 2 are installed in a building to monitor the area shown in FIG. 6.

First, the intrusion determination unit 31 excludes an object 100 detected by the radar device 1 if its direction of travel is definitely away from the area in which no intrusion is permitted. That is, in this embodiment, an explanation is provided about the situation where an object 100 approaching a building should be alerted. In this example, a radar device is assumed to be installed in a building, and the relative speed of an object in a direction going away from the building is assumed to be positive. If relative speed v of the object is detected as being positive for a time period longer than the prescribed time T, it is determined that this object is moving away from the building and therefore, this object is excluded from intruder candidates. If the intrusion determination unit 31 determines that the detected object 100 is an intruder candidate, the location information converting unit 32 estimates the location on the screen image captured by the imaging device 2 according to the location information (r, α) detected by the radar device 1.

In FIG. 7, the polar coordinate system with a radar device 1 as the origin is specified as a radar coordinate system, and location information (r, α) of the detected object 100 is defined. Furthermore, the right-handed coordinate system in which the center of the lens 10 is the origin, the Z-axis extends in the direction of the main axis of the lens 10 and the X-axis and Y-axis extend in parallel to the imaging surface is defined as a camera coordinate system X-Y-Z, and the coordinates of the radar device 1 mounting position are expressed as (Xd, Yd, Zd). Herein, the object's location P (Xp, Yp, Zp) in the camera coordinate system is expressed by the following equation:

$$\begin{cases} Xp = Xd + r\sin\alpha \\ Yp = -Yd \\ Zp = Zd + r\cos\alpha \end{cases} \quad \text{(Equation 3)}$$

Figure 8:
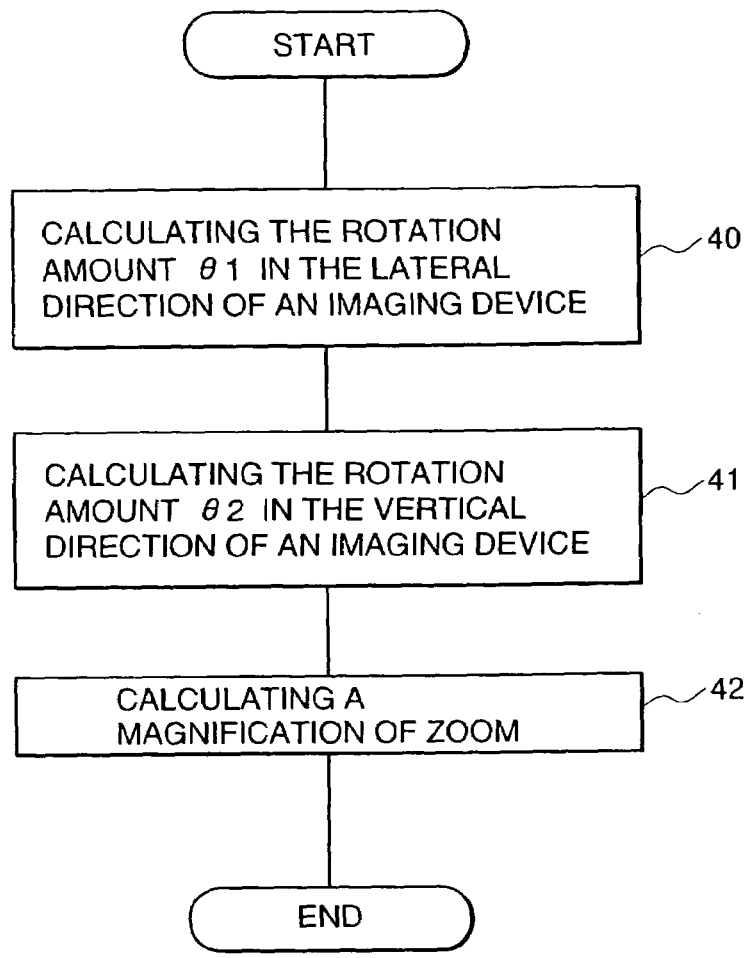
FIG. 8 shows an example of the operations to control the direction and the zoom function of the imaging device.

According to the detected object's location P in the camera coordinate system calculated by the location information converting unit 32, a magnification of zoom is calculated so that the zoom function control unit 33 can control the lens moving device 11 to enlarge or reduce the size of the screen. Furthermore, the direction is calculated to coincide the direction of the imaging device 2 with the direction of the object so that the moving device control unit 34 can control the moving device 3 to adjust the direction of the imaging device 2. The procedure for calculating the magnification of zoom and the direction to move the imaging device 2 will be explained by referring to FIG. 8.

Figure 7A:
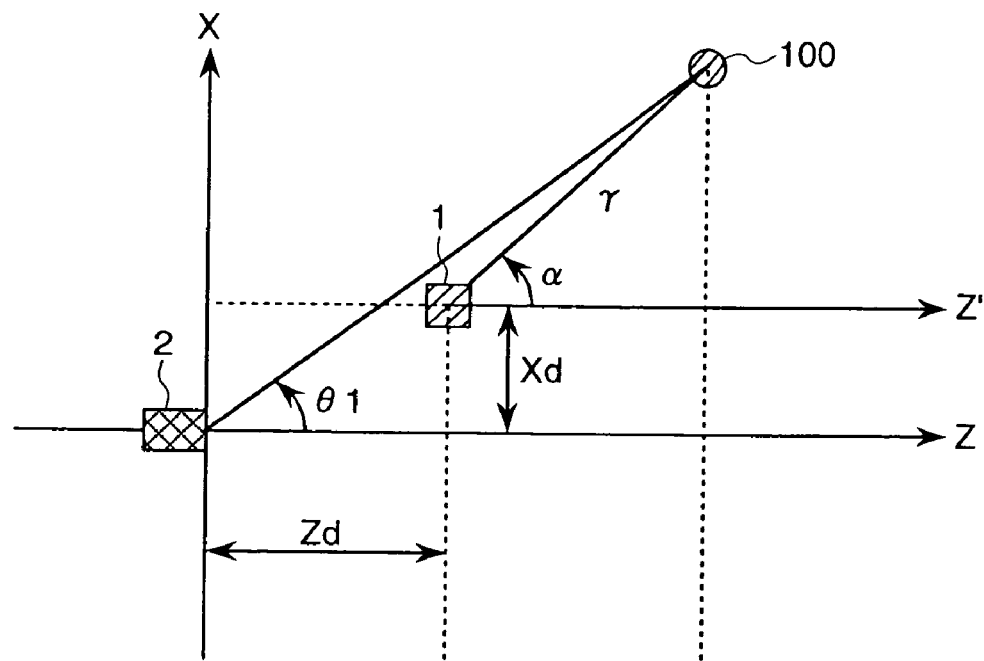
FIG. 7 shows an example of the method in which a radar device and an imaging device are installed in a building.

First, in step 40, rotation angle θ for rotating the imaging device 2 in the lateral direction is calculated. By defining θ$_1$ as shown in FIG. 7(a), θ$_1$ can be calculated by the following equation using the detected object's location P.

$$\theta_1 = \tan^{-1}\left(\frac{Xp}{Zp}\right). \quad \text{(Equation 4)}$$

Figure 7B:
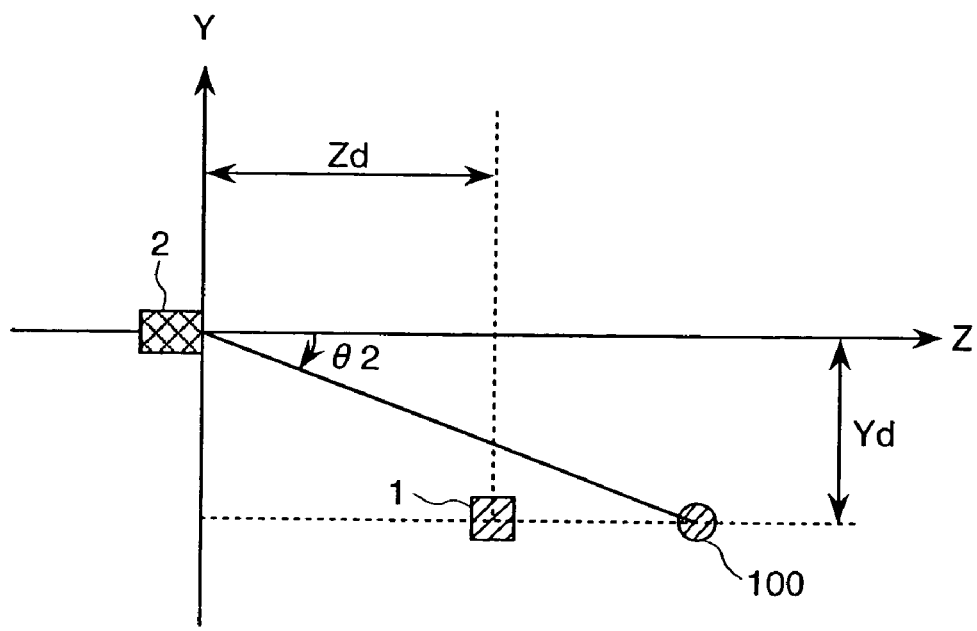

Next, in step 41, rotation angle θ$_2$ for rotating the imaging device 2 in the vertical direction is calculated. By defining θ$_2$ as shown in FIG. 7(b), θ$_2$ can be calculated by the following equation using the detected object's location P.

$$\theta_2 = \tan^{-1}\left(\frac{Yp}{Zp}\right) \quad \text{(Equation 5)}$$

Next, in step 42, a magnification of zoom in the imaging device 2 is calculated. Assuming that the distance from the imaging device 2 to the detected object 100 is R, R can be expressed by the following equation:

$$R = \sqrt{Xp^2 + Yp^2 + Zp^2} \quad \text{(Equation 6)}$$

Let the magnification of the lens be P, and P is defined by the following equation:

$$P = \frac{R}{K} \quad \text{(Equation 7)}$$

Figure 9:
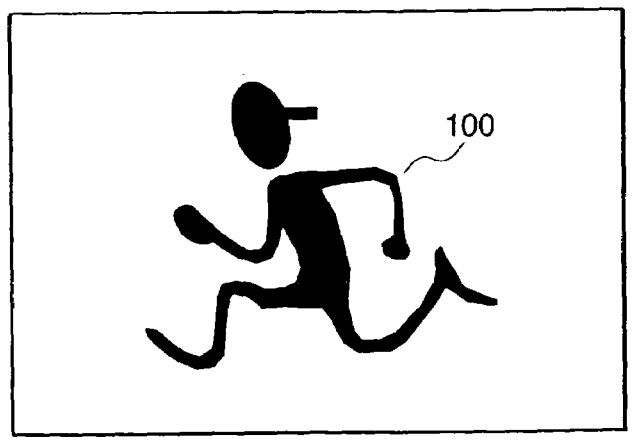
FIG. 9 shows an example in which a picture of an intruder taken by the imaging device is being displayed.

Herein, K is a parameter determined by the specifications of the lens 10 and is defined beforehand by the following procedure. As FIG. 9 shows, the distance at which a picture of an object is recorded by the imaging device 2 installed in the building so that the picture shown on the monitor screen is large enough for the operator to identify the object as a person is calculated beforehand and the value is defined as K. For example, it is assumed that the display in FIG. 9 indicates that a person is seen at a distance of 5 [m] from the imaging device and K=5 is defined. In equation 7, if the distance to the detected object 100 is calculated as R=30 [m] in the camera coordinate system, P=6 can be obtained, which means that the image shown on the monitor is magnified six times.

Next, if the intrusion determination unit 31 determines that the detected object 100 is an intruder candidate, the location information converting unit 32 estimates location P$_1$ of the object 100 using the lighting device 5 as reference according to the location information (r, α) detected by the radar device 1.

Figure 10A:
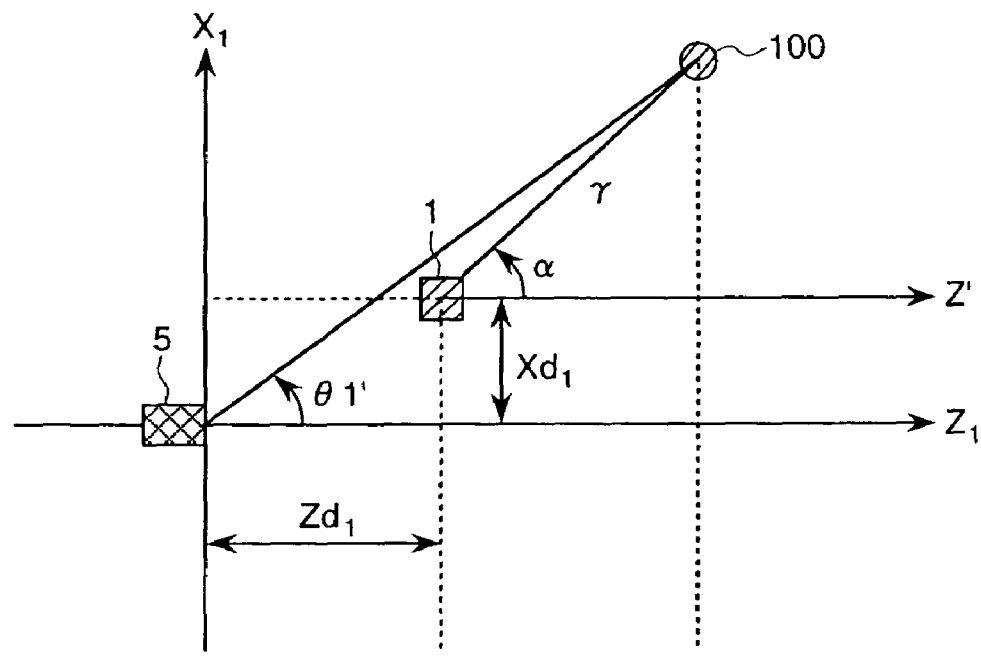
FIG. 10 shows an example of the method in which a radar device and a lighting device are installed in a building.
Figure 10B:
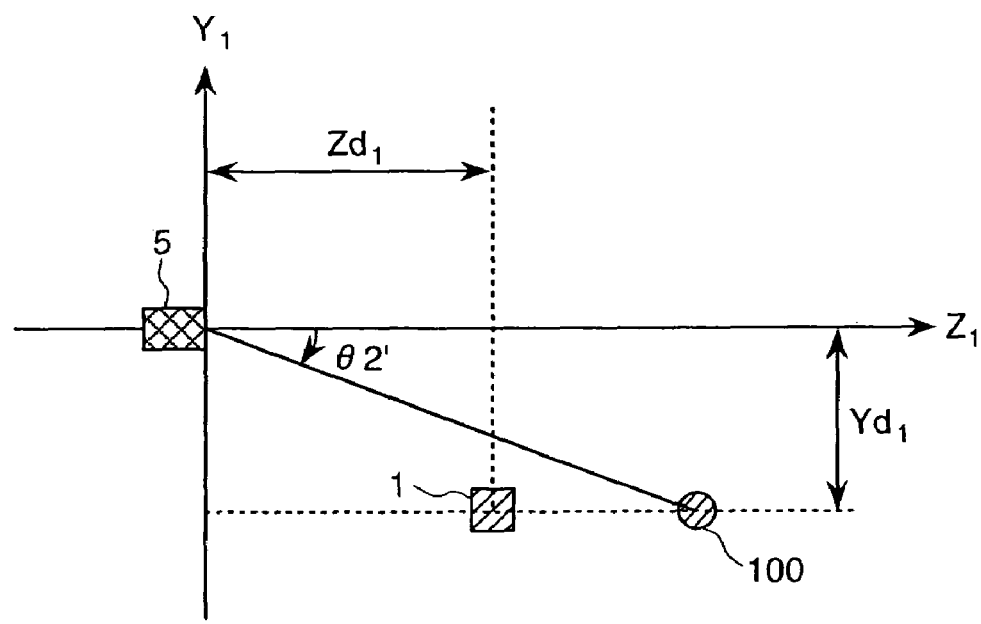

In FIG. 10, the right-handed coordinate system in which the center of the luminous body 13 is the origin, the Z$_1$-axis extends in the direction of the main axis of the luminous body 13 and the X$_1$-axis and Y$_1$-axis extend in parallel to the illuminating surface is defined as a light coordinate system X$_1$-Y$_1$-Z$_1$, and the coordinates of the radar device 1 mounting position are expressed as (Xd$_1$, Yd$_1$, Zd$_1$). Herein, the object's location P$_1$(Xp$_1$, Yp$_1$, Zp$_1$) in the light coordinate system is expressed by the following equation:

$$\begin{cases} Xp_1 = Xd_1 + r\sin\alpha \\ Yp_1 = -Yd_1 \\ Zp_1 = Zd_1 + r\cos\alpha \end{cases} \quad \text{(Equation 8)}$$

According to the detected object's location P$_1$ in the light coordinate system calculated by the location information converting unit 32, intensity of light that illuminates the object is calculated so that light intensity control unit 35 can control the light-intensity adjusting device 14 to adjust the intensity of light. Furthermore, the direction is calculated to coincide the direction of the lighting device 5 with the direction of the object so that the direction control unit 36 can control the light moving device 15 to adjust the direction of the lighting device 5. The procedure for calculating light intensity a nd the direction to move the lighting device 5 will be explained by referring to FIG. 11.

First, in step 43, rotation angle $\theta_1'$ for rotating the lighting device 5 in the lateral direction is calculated. By defining $\theta_1'$ as shown in FIG. 10(*a*), $\theta_1'$ can be calculated by the following equation using the detected object's location $P_1$.

$$\theta_1' = \tan^{-1}\left(\frac{Xp_1}{Zp_1}\right) \quad \text{(Equation 9)}$$

Next, in step 44, rotation angle $\theta_2'$ for rotating the lighting device 5 in the vertical direction is calculated. By defining $\theta_2'$ as shown in FIG. 10(*b*), $\theta_2'$ can be calculated by the following equation using the detected object's location $P_1$.

$$\theta_2' = \tan^{-1}\left(\frac{Yp_1}{Zp_1}\right) \quad \text{(Equation 10)}$$

Next, in step 45, light intensity in the lighting device 5 is calculated. Assuming that the distance from the lighting device 5 to the detected object 100 is $R_1$, $R_1$ can be expressed by the following equation:

$$R_1 = \sqrt{Xp_1^2 + Yp_1^2 + Zp_1^2} \quad \text{(Equation 11)}$$

Let the electric power which is the light intensity of the luminous body 13 be $P_1$, and $P_1$ is defined by the following equation:

$$P_1 = \frac{R_1^2}{T} \quad \text{(Equation 12)}$$

Herein, T is a parameter for controlling electric power to be supplied to the luminous body so that the function of the distance $R_1$ to the detected object can be established.

Figure 12:
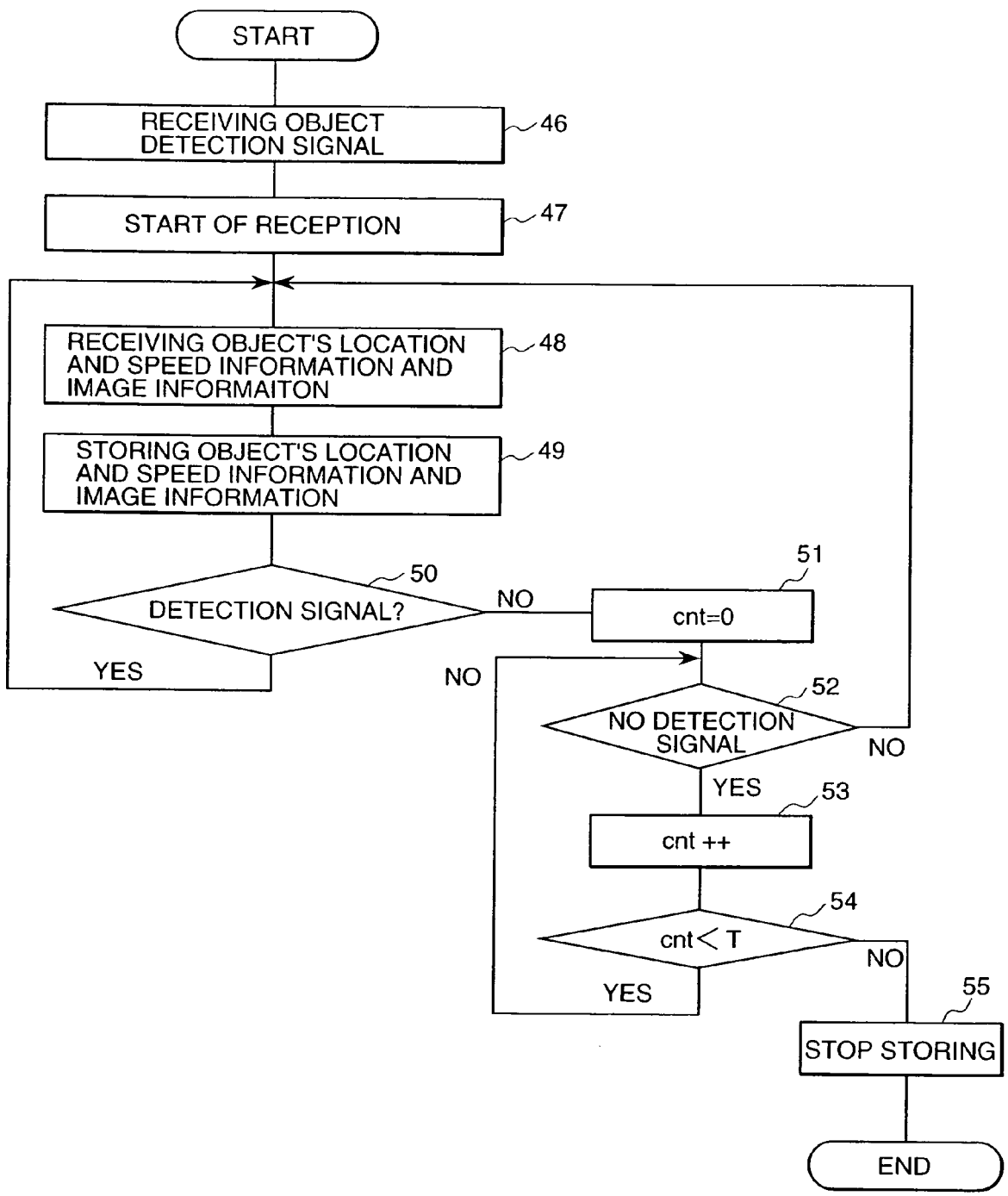
FIG. 12 shows an example of the procedure of the data storing unit.

Next, operations of the data storing unit 39 will be explained with reference to FIG. 12. If the intrusion determination unit 31 determines that the detected object 100 is an intruder candidate, it transmits a signal to the data storing unit 39 to notify that the object 100 has been detected. Therefore, in step 46, the signal indicating that the radar device 1 has detected an object 100 is received, and is stored in step 47. In step 48, location information (r, α) and the relative speed v of the object 100 detected by the radar device 1 and image information of the object 100 recorded by the imaging device 2 are received, and the information is then stored in step 49. In step 50, if the signal indicating that the radar device 1 had detected an object 100 has been received, the operation returns to step 48, and receipt and storage of the information is repeated. In step 50, when the signal indicating that the radar device 1 has detected an object 100 is not received, the operation proceeds to step 51 where the counter number cnt is set as: cnt=0. In step 52, if the object detection signal has not been received, the counter number cnt is increased in step 53, and in step 54, while the cnt is smaller than time T, the operation returns to step 52 where the detection signal is repeatedly checked. Furthermore, in step 52, if the object detection signal is received, the operation returns to step 48, and subsequently, information is received and stored. In step 54, when the cnt becomes equal to time T, the operation proceeds to step 55 and data storage stops.

Next, operations of the data recording control unit 37 will be explained. When the data storing unit 39 receives object detection information, the data recording control unit 37 retrieves the above-mentioned image information and location information and transmits the information to the recording device 6. The recording device 6 stores the image information in an image memory such as a VTR and also stores information about the distance, angle and speed in the memory. This enables data to be recorded only when an intruding object 100 must be recorded, resulting in reduction of necessary storage capacity when compared to storage capacity required for recording on a steady basis.

Now, operations of the send/receive control unit 38 will be explained. When the data storing unit 39 receives object detection information, the send/receive control unit 38 retrieves the above-mentioned image information and location information and sends the information to the center 26 via the transmitting device 7.

As image information, the picture of the detected object is stored by performing compression or non-compression. However, to quickly send and receive image information and monitor it online, it is desirable for the transmitting device 7 to compress the picture and send it as image information. The transmission means may be a standard means such as RS-232C or ISDN. Standard image compression techniques such as JPEG or MPEG may be used to compress image information. Furthermore, as long as it can be sent and received fast enough to be monitored online, image information does not have to be compressed or it may be compressed in a different technique. Any technique is available as long as the image data can be displayed quickly and accurately in the center 26. The image and other data sent by the transmitting device 7 is received in the same data configuration by the receiving device 25 located in the remote center 26.

Herein, it is possible to store numerical data about the object's 100 location and speed displayed on the screen as image information. Furthermore, the above-mentioned data may be synthesized with a transmitted picture and stored as image information. Transmission of the location and speed information ab out the object 100 enables the indication of what distance from the building the intruder is approaching.

When the receiving device receives the signal in the center where an operator is standing by, the image information in chronological order is displayed on the display device 8. Simultaneously, the annunciation device 9 outputs an annunciation signal indicating that an object has been detected. A general annunciation signal uses sound to notify the operator; however, other methods may be utilized. Thus, the above-mentioned system eliminates the necessity for the operator to be constantly looking at the display device, resulting in a reduced burden on the operator. Furthermore, the operator can determine whether the detected object is an intruder or not by watching the screen of the display device instead of rushing to the site. As a result, even if the radar device 1 has mistakenly detected an object other than an intruder and transmitted the signal to the center, the operator does not have to rush to the site thereby reducing a burden on the operator.

A security system which monitors an area around a building can track a detected intruder and accurately takes a picture of it. Furthermore, an operator can determine whether the detected object is an intruder or not without rushing to the site. Moreover, by broadening the beam width of the radar device, it is possible to reduce the number of radar devices while obtaining information about the entire monitoring area instead of alternately switching the radar devices or making the radar device rotating back and forth.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A security system comprising a detection means for radiating light or an electric wave to a prescribed area, receiving a wave reflected by an object, and obtaining at least a relative speed and location of said object, an imaging means for picking up image information of the prescribed area, a moving means for changing the imaging direction of said imaging means a control device that determines from the relative speed if said object is an intruder or moving away candidate, and a recording device that starts recording when said control device determines that said object is an intruding object, wherein said moving means is controlled according to the relative speed and location of said object so as to direct the imaging direction of said imaging means toward said object, and said detection means determines the relative speed of said object and transmits an electric wave from one transmission antenna and receives the signal by two receiving antennas to detect the azimuth of the target.

2. A security system according to claim 1, wherein said detection means is a 2-frequency CW type millimeter wave radar.

3. A security system according to claim 1, wherein said imaging means is a camera.

4. A security system according to claim 1, wherein said imaging means has a zoom means for enlarging or reducing the size of the image information according to the relative speed and location of said object.

5. A security system according to claim 1, further comprising a lighting means for radiating light or an electric wave to the prescribed area and a means for changing the radiation direction of said lighting means, wherein light or an electric wave is radiated according to the location of said object to pick up an image of said object.

6. A security system according to claim 5, wherein said lighting means can change output according to the location of said object.

7. A security system according to claim 1, wherein said recording means records at least the relative speed and location of said object detected by said detection means or image information captured by said imaging means.

8. A security system according to claim 1, further comprising a transmission means for transmitting an output of said detection means and/or an output of said imaging means, wherein at least the relative speed and location of said object detected by said detection means or image information captured by said imaging means is transmitted.

9. A security system according to claim 8, further comprising a means for processing image information of said object and determining whether said object detected by said detection means is a person or not, wherein when it is determined that said detected object is a person, at least the relative speed and location of said object detected by said detection means or image information captured by said imaging means is transmitted.

10. A security system according to claim 8, further comprising a receiving means for receiving information transmitted by said transmission means, and an information display means for displaying information received by said receiving means.

11. A security system according to claim 1, wherein said moving means changes the imaging direction of said imaging means, a transmission means is provided for transmittng an output of said detection means and/or an output of said imaging means, a receiving means for receiving information transmitted by said transmission means, and a display means is provided for displaying received information for observation by an operator, wherein said moving means is controlled according to the relative speed and location of said object so as to track said object and pick up an image of said object.

12. A security system according to claim 11, further comprising an annunciation means for notifying an operator that said receiving means has received information.

13. A security system according to claim 12, wherein said annunciation means notifies the operator of the receipt of said information by means of sound.

14. A security system according to claim 12, further comprising a means for processing image information of said object and determining whether said object received by said receiving means is a person or not, wherein when it is determined that said detected object is a person, said annunciation means is activated.

15. A security system according to claim 11, further comprising a means for processing image information of said object and determining whether said object received by said receiving means is a person or not, wherein when it is determined that said detected object is a person, said display means starts to display said image information.

16. A radar device for a security system according to claim 1, wherein said security system is installed outside the building, radiates light or an electric wave to a prescribed area, receives a wave reflected by an object, and obtains at least the relative speed and location of said object, wherein the beam width of the radar device is at least 10 degrees.

17. A radar device for a security system according to claim 16, wherein the location of said object is detected by one transmission antenna transmitting an electric wave and two receiving antennas receiving the signal.

* * * * *